(12) United States Patent
Huang et al.

(10) Patent No.: US 11,089,645 B2
(45) Date of Patent: Aug. 10, 2021

(54) RESOURCE SCHEDULING METHOD AND APPARATUS, AND BASE STATION

(71) Applicant: CLOUDMINDS (SHANGHAI) ROBOTICS CO., LTD., Shanghai (CN)

(72) Inventors: William Xiao-Qing Huang, Shenzhen (CN); Haitao Jiang, Shenzhen (CN); Zhenkai Wang, Shenzhen (CN)

(73) Assignee: CLOUDMINDS (SHANGHAI) ROBOTICS CO., LTD.

( * ) Notice: Subject to any disclaimer, the term of this patent is extended or adjusted under 35 U.S.C. 154(b) by 168 days.

(21) Appl. No.: 16/436,279

(22) Filed: Jun. 10, 2019

(65) Prior Publication Data
US 2019/0297659 A1    Sep. 26, 2019

Related U.S. Application Data

(63) Continuation of application No. PCT/CN2017/079123, filed on Mar. 31, 2017.

(51) Int. Cl.
*H04W 72/04* (2009.01)
*H04W 76/15* (2018.01)
(Continued)

(52) U.S. Cl.
CPC .............. *H04W 76/15* (2018.02); *H04W 8/24* (2013.01); *H04W 72/048* (2013.01);
(Continued)

(58) Field of Classification Search
None
See application file for complete search history.

(56) References Cited

U.S. PATENT DOCUMENTS

| 2015/0271726 A1* | 9/2015 | Kim | H04W 76/16 370/329 |
| 2016/0295613 A1* | 10/2016 | Wager | H04L 41/0813 |

(Continued)

FOREIGN PATENT DOCUMENTS

| CN | 103327630 A | 9/2013 |
| CN | 104519583 A | 4/2015 |

(Continued)

OTHER PUBLICATIONS

PCT International Search Report and Written Opinion dated Nov. 28, 2017 in corresponding Application No. PCT/CN2017/079123, 9 pages.

(Continued)

*Primary Examiner* — Jenkey Van
(74) *Attorney, Agent, or Firm* — Dilworth IP, LLC (57) ABSTRACT

The present invention discloses a resource scheduling method and apparatus, and a base station. The method is applied to a dual connectivity scenario, in the dual connectivity scenario, a terminal respectively establishes a communication connection with a master serving base station and a slave serving base station, the method is applied to the master serving base station, and the method includes: obtaining terminal capability information, wherein the terminal capability information includes basic capability information and dynamic capability information; and sending the terminal capability information to the slave serving base station, so that the slave serving base station determines terminal resources to be scheduled on request according to the terminal capability information.

20 Claims, 5 Drawing Sheets

(51) Int. Cl.
*H04W 8/24* (2009.01)
*H04W 72/08* (2009.01)
*H04W 72/12* (2009.01)
*H04W 84/20* (2009.01)

(52) U.S. Cl.
CPC ..... *H04W 72/0486* (2013.01); *H04W 72/085* (2013.01); *H04W 72/1257* (2013.01); *H04W 72/1263* (2013.01); *H04W 72/1289* (2013.01); *H04W 84/20* (2013.01)

(56) References Cited

U.S. PATENT DOCUMENTS

| | | | |
|---|---|---|---|
| 2017/0013499 A1* | 1/2017 | Chen | H04W 72/048 |
| 2017/0078975 A1* | 3/2017 | Takeda | H04W 52/40 |
| 2018/0049073 A1* | 2/2018 | Dinan | H04W 4/70 |
| 2018/0146410 A1* | 5/2018 | Cho | H04W 36/0061 |
| 2019/0342932 A1* | 11/2019 | Futaki | H04W 76/15 |
| 2020/0267791 A1* | 8/2020 | Yilmaz | H04W 76/16 |

FOREIGN PATENT DOCUMENTS

| | | | | |
|---|---|---|---|---|
| CN | 105228171 A | 1/2016 | | |
| WO | 20150447692 A2 | 4/2015 | | |
| WO | WO-2015044771 A2 * | 4/2015 | ........... | H04L 5/0037 |

OTHER PUBLICATIONS

Ericsson et al., Overall Procedures for Offloading over Xn, 3GPP TSG-RAN WG2 Meeting #83, R2-132715, Aug. 2013, section 2.1, 9 pages.

EP Office Action in related case EP Application No. 17902823.8, Applicant: Cloudminds (Shenzhen) Robotics System Col., Ltd., 16 pages, dated Nov. 4, 2020.

Intel Corporation (Rapporteur): "Report of email discussion: [94#39][NR] C plane aspects for tight interworking", 3GPP Draft; R2-165012-NR-CP-Email-V3, 3rd Generation Partnership Project (3GPP), Mobile Competence Centre ; 650, Route Des Lucioles ; F-06921 Sophia-Antipolis Cedex; France, vol. RAN WG2, No. Gothenburg, Sweden; Aug. 22, 2016-Aug. 26, 2016 Aug. 21, 2016, XP051126652.

* cited by examiner

Fig. 10 ately establishes a communication connection with a master serving base station and a slave serving base station, the method is applied to the slave serving base station, and the method includes: receiving terminal capability information sent by the master serving base station; wherein the terminal capability information includes basic capability information and dynamic capability information of the terminal; and determining terminal resources to be scheduled on request according to the received terminal capability information.

RESOURCE SCHEDULING METHOD AND APPARATUS, AND BASE STATION

CROSS-REFERENCE TO RELATED APPLICATIONS

This application is a continuation application under 35 U.S.C. § 120 of PCT application No. PCT/CN2017/079123 filed on Mar. 31, 2017, the contents of which are incorporated herein by reference.

FIELD OF THE INVENTION

The present disclosure relates to the technical field of communication, and in particular, to a resource scheduling method and apparatus, and a base station.

BACKGROUND OF THE INVENTION

Standardization of research projects of 5G (Fifth Generation Mobile Phone Mobile Communication Standard) is being conducted in the 3GPP (3rd Generation Partnership Project), but to ensure the network investment and coverage advantages of LTE (Long Term Evolution), the initial 5G may be deployed in the form of dual connectivity with the LTE to form a 5G-LTE dual connectivity scenario, in the scenario, a low frequency band LTE network is used as a mobility management control entity, and a high frequency band and large-bandwidth 5G is used as a capacity bearer, when terminal scheduling is performed, an LTE base station and a 5G base station are independently scheduled. However, when the internal design of the terminal supporting the dual connectivity work is actually designed, the LTE and the 5G share some terminal capabilities, for example, data processing capability, buffers, radio frequency channels, antennas, etc.

However, when the LTE base station or the 5G base station is scheduling resources, it cannot know how many resources of the terminal are occupied by the opposite side, in this way, when the terminal scheduling is performed, the scheduled resources may exceed the maximum buffer of the terminal; or the terminal may generate collision on the use of the radio frequency channel or the antenna, resulting in failure of data transmission.

SUMMARY OF THE INVENTION

The present invention provides a resource scheduling method and apparatus, and a base station, which can perform capability negotiation between a master serving base station and a slave serving base station, thereby avoiding the problem of data transmission failure.

In order to achieve the above purpose, a first aspect according to embodiments of the present disclosure provides a resource scheduling method, applied to a dual connectivity scenario, in the dual connectivity scenario, a terminal respectively establishes a communication connection with a master serving base station and a slave serving base station, the method is applied to the master serving base station, and the method includes:

obtaining terminal capability information; wherein the terminal capability information includes basic capability information and dynamic capability information; and sending the terminal capability information to the slave serving base station, so that the slave serving base station determines terminal resources to be scheduled on request according to the terminal capability information.

A second aspect according to the embodiments of the present disclosure provides a resource scheduling method, applied to a dual connectivity scenario, in the dual connectivity scenario, a terminal respectively establishes a communication connection with a master serving base station and a slave serving base station, the method is applied to the slave serving base station, and the method includes: receiving terminal capability information sent by the master serving base station; wherein the terminal capability information includes basic capability information and dynamic capability information of the terminal; and determining terminal resources to be scheduled on request according to the received terminal capability information.

A third aspect according to the embodiments of the present disclosure provides a resource scheduling apparatus, applied to a dual connectivity scenario, in the dual connectivity scenario, a terminal respectively establishes a communication connection with a master serving base station and a slave serving base station, the apparatus is applied to the master serving base station, and the apparatus includes: an obtaining module, configured to obtain terminal capability information; wherein the terminal capability information includes basic capability information and dynamic capability information; and a first sending module, configured to send the terminal capability information to the slave serving base station, so that the slave serving base station determines terminal resources to be scheduled on request according to the terminal capability information.

A fourth aspect according to the embodiments of the present disclosure provides a resource scheduling apparatus, applied to a dual connectivity scenario, in the dual connectivity scenario, a terminal respectively establishes a communication connection with a master serving base station and a slave serving base station, the apparatus is applied to the slave serving base station, and the apparatus includes: a capability information receiving module, configured to receive terminal capability information sent by the master serving base station; the terminal capability information includes basic capability information and dynamic capability information of the terminal; and a resource determining module, configured to determine terminal resources to be scheduled on request according to the received terminal capability information.

A fifth aspect according to the embodiments of the present disclosure provides a non-transitory computer readable storage medium, the non-transitory computer readable storage medium includes one or more programs, and the one or more programs are used for executing the method of the above first aspect.

A sixth aspect according to the embodiments of the present disclosure provides a non-transitory computer readable storage medium, the non-transitory computer readable storage medium includes one or more programs, and the one or more programs are used for executing the method of the above second aspect.

A seventh aspect according to the embodiments of the present disclosure provides a base station, and the terminal includes: the non-transitory computer readable storage medium of the above fifth aspect; and one or more processors for executing a program in the non-transitory computer readable storage medium.

An eighth aspect according to the embodiments of the present disclosure provides a base station, and the terminal includes: the non-transitory computer readable storage medium of the above sixth aspect; and one or more processors for executing a program in the non-transitory computer readable storage medium.

By adoption of the above technical solutions, the terminal capability information is obtained; wherein the terminal capability information includes the basic capability information and the dynamic capability information; and the terminal capability information is sent to the slave serving base station, so that the slave serving base station determines the terminal resources to be scheduled on request according to the terminal capability information. In this way, the master serving base station and the slave serving base station performs resource scheduling based on the basic capability information and the dynamic capability information of the terminal, thereby avoiding the problem of data transmission failure because the scheduled resources exceed the maximum buffer of the terminal, or the terminal generates collision on the use of the radio frequency channel or the antenna, so that the resources of the terminal are better utilized.

DETAILED DESCRIPTION OF THE EMBODIMENTS

The specific embodiments of the present disclosure will be described in detail below with reference to the drawings. It should be understood that the specific embodiments described herein are merely used for illustrating and explaining the present disclosure, rather than limiting the present disclosure.

The present invention can be applied to a 5G-LTE dual connectivity scenario, and in the scenario, a terminal moves between LTE and 5G network coverage areas, establishes a parallel connection with the two networks, and then performs seamless network switching. A serving base station of the terminal is a master serving base station, and the base station of the other network is a slave serving base station, for example, if the current serving base station of the terminal is the base station of the 5G network, then the base station of the 5G network is the master serving base station, and the base station of the LTE network is the slave serving base station, similarly, if the current serving base station of the terminal is the LTE network, then the base station of the LTE network is the master serving base station, and the base station of the 5G network is the slave serving base station, when the terminal supports the 5G-LTE dual connectivity work, the master serving base station will send a service request of establishing a dual connectivity for the terminal to the slave serving base station, the slave serving base station responds to the request, and the master serving base station establishes a dual connectivity service.

When terminal resource scheduling is performed, the basic capability information of the terminal is reported to a core network device during the access of the terminal, when the 5G-LTE dual connectivity is established, the master serving base station sets fixed terminal resources for ensuring the demand of the master serving base station, and the slave serving base station uses the remaining resources of the terminal. However, the above configuration is equivalent to a static configuration, when the master serving base station does not need too many terminal resources, the fixed resources set for the master serving base station are not fully utilized, thereby causing waste of resources.

In order to solve the above problems, the present invention provides a resource scheduling method and apparatus, and a base station, a master serving base station and a slave serving base station perform dynamic capability negotiation based on basic capability information and dynamic capability information of a terminal, and perform resource scheduling according to the negotiation result, so as to better utilize the resources of the terminal.

The present invention will be described in detail below in combination with specific embodiments.

Figure 1:
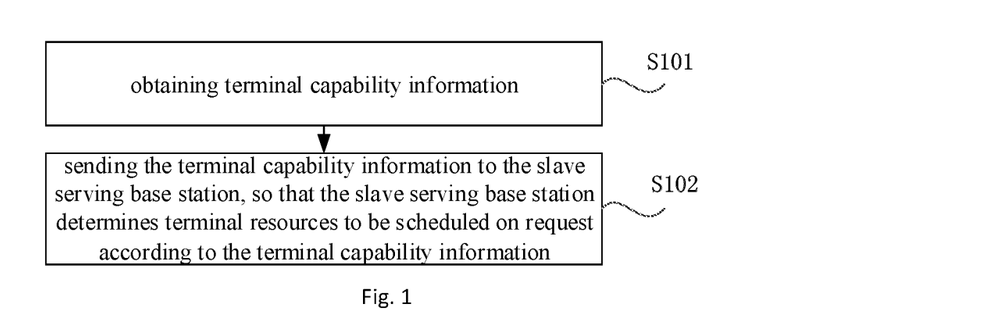
FIG. 1 is a schematic flow diagram of a resource scheduling method provided by an embodiment of the present invention.

FIG. 1 shows a resource scheduling method provided by an embodiment of the present invention. As shown in FIG. 1, the method is applied to a dual connectivity scenario, in the dual connectivity scenario, a terminal respectively establishes a communication connection with a master serving base station and a slave serving base station, the method is applied to the master serving base station, and the method includes:

S101. obtaining terminal capability information.

Wherein, the terminal capability information includes basic capability information and dynamic capability information, and the basic capability information includes terminal resources corresponding to the maximum capability supported by the terminal; and the dynamic capability information includes terminal resources used by the master serving base station at a scheduling time, or, terminal resources capable of being used by the slave serving base station at the scheduling time.

S102. sending the terminal capability information to the slave serving base station, so that the slave serving base station determines terminal resources to be scheduled on request according to the terminal capability information.

By adoption of the above method, the master serving base station sends the obtained basic capability information and the dynamic capability information of the terminal to the slave serving base station, and the slave serving base station determines the terminal resources to be scheduled on request according to the basic capability information and the dynamic capability information, thereby avoiding the problem of data transmission failure because the scheduled resources exceed the maximum buffer of the terminal, or the terminal generates collision on the use of the radio frequency channel or the antenna, so that the resources of the terminal are better utilized.

Figure 2:
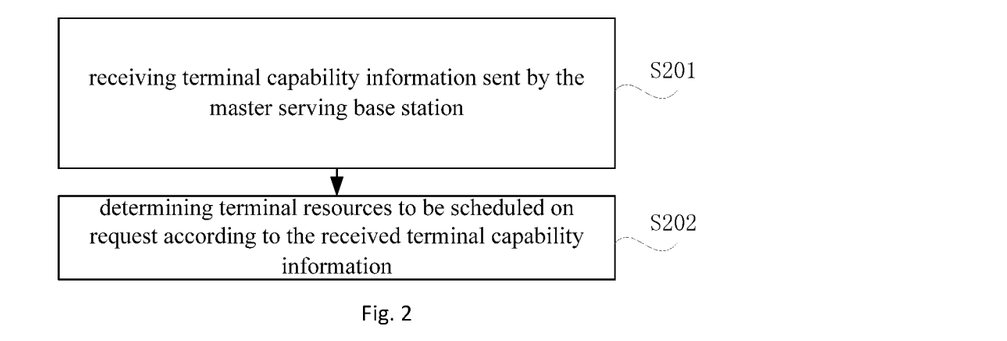
FIG. 2 is a schematic flow diagram of another resource scheduling method provided by an embodiment of the present invention.

FIG. 2 shows a resource scheduling method provided by an embodiment of the present invention. As shown in FIG. 2, the method is applied to a dual connectivity scenario, in the dual connectivity scenario, a terminal respectively establishes a communication connection with a master serving base station and a slave serving base station, the method is applied to the slave serving base station, and the method includes:

S201. receiving terminal capability information sent by the master serving base station.

Wherein, the terminal capability information includes basic capability information and dynamic capability information, and the basic capability information includes terminal resources corresponding to the maximum capability supported by the terminal; and the dynamic capability information includes terminal resources used by the master serving base station at a scheduling time, or, terminal resources capable of being used by the slave serving base station at the scheduling time.

S202. determining terminal resources to be scheduled on request according to the received terminal capability information.

By adoption of the above method, the slave serving base station receives the basic capability information and the dynamic capability information of the terminal sent by the master serving base station, and determines the terminal resources to be scheduled on request according to the basic capability information and the dynamic capability information of the terminal, thereby avoiding the problem of data transmission failure because the scheduled resources exceed the maximum buffer of the terminal, or the terminal generates collision on the use of the radio frequency channel or the antenna, so that the resources of the terminal are better utilized.

Figure 3:
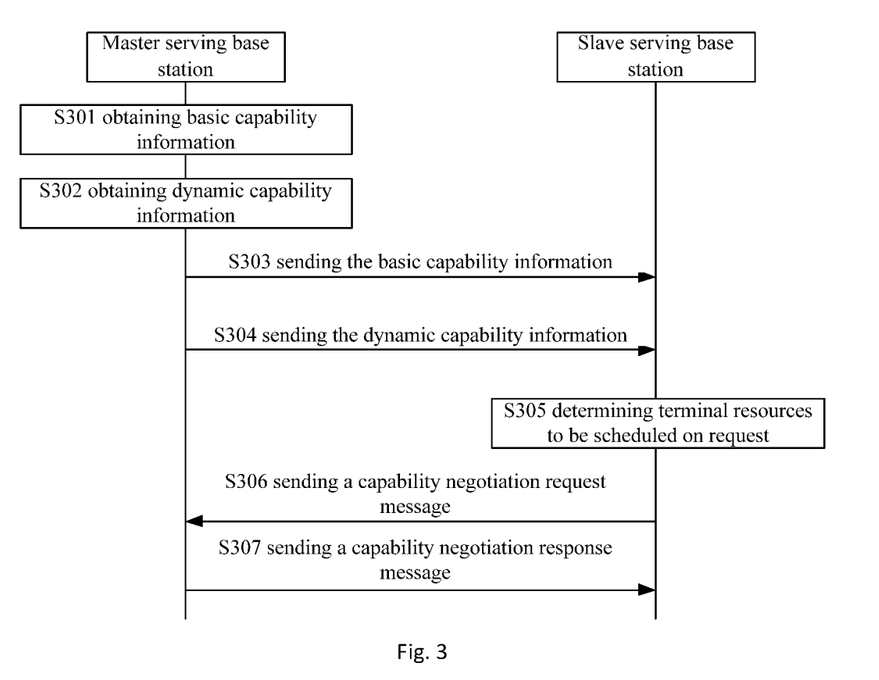
FIG. 3 is a schematic flow diagram of a third resource scheduling method provided by an embodiment of the present invention.

FIG. 3 shows a resource scheduling method provided by an embodiment of the present invention. As shown in FIG. 3, the method includes:

S301. a master serving base station obtains basic capability information of a terminal.

The basic capability information may include at least one of the following:

maximum buffer supported by the terminal; the maximum number of radio frequency channels supported by the terminal; all working frequency bands supported by the terminal; maximum carrier aggregation capability supported by the terminal; maximum number of MIMO (Multiple-Input Multiple-Output) levels supported by the terminal on each working frequency band, and DRX (Discontinuous Reception) configuration. Of course, the above information is only an example, and this is not limited in the present invention.

In the present step, the basic capability information of the terminal may be obtained in any one of the following two implementation manners:

Manner 1: the master serving base station obtains the basic capability information reported by the terminal.

Herein, the terminal may report the basic capability information to the master serving base station.

Manner 2: the master serving base station obtains the basic capability information from a core network device.

Wherein, the core network device is a network device of a core network where the master serving base station is located.

Herein, since the basic capability information of the terminal is reported to the core network device when the terminal accesses the network, the master serving base station may also directly obtain the basic capability information from the core network device.

S302. The master serving base station obtains dynamic capability information.

Wherein, the dynamic capability information may include:

a first terminal capability configuration set capable of being used by the slave serving base station at a scheduling time, and the first terminal capability configuration set includes at least one of buffer, the number of radio frequency channels and a working frequency band capable of being used by the slave serving base station; and Wherein, the scheduling time may include a current moment; or a scheduling effective time period of the dynamic capability information determined according to a transmission delay with the slave serving base station; or any moment within the scheduling effective time period.

Or, a second terminal capability configuration set capable of being used by the master serving base station at the scheduling time, and the second terminal capability configuration set includes at least one of the buffer, the number of radio frequency channels and the working frequency band capable of being used by the master serving base station; or, a first set identifier corresponding to the first terminal capability configuration set capable of being used by the slave serving base station at the scheduling time; or a second set identifier corresponding to the second terminal capability configuration set capable of being used by the master serving base station at the scheduling time.

It should be noted that each parameter in the first terminal capability configuration set and the second terminal capability configuration set is a corresponding numerical value, the first set identifier and the second set identifier are equivalent to pre-establishing a corresponding relationship between the first terminal capability configuration set and the first set identifier and the corresponding relationship between the second terminal capability configuration set and the second set identifier, the corresponding relationships can be known to both of the master serving base station and the slave serving base station, so that if the dynamic capability information is sent to the slave serving base station through the set identifier subsequently, only the corresponding set identifier is sent to the slave serving base station without sending the related dynamic capability information by multiple signalings, thereby reducing the overhead of signaling resources.

S303. the master serving base station sends the obtained basic capability information of the terminal to the slave serving base station.

S304. the master serving base station sends the obtained dynamic capability information of the terminal to the slave serving base station when a first preset sending condition is met.

Wherein, in the step S303 and the step S304, a transmission interface is configured between the master serving base station and the slave serving base station, then the master serving base station and the slave serving base station may transmit the basic capability information and the dynamic capability information through the transmission interface, and subsequent capability negotiation request messages and capability negotiation response messages may also be transmitted through the transmission interface.

In the present step, the first preset sending condition may include any one of the following three conditions:

Condition 1: receiving a downlink service request corresponding to the terminal.

Wherein, the downlink service request may be a request that the master serving base station performs downlink service scheduling on the terminal.

Condition 2: receiving an uplink scheduling request sent by the terminal.

Condition 3: determining terminal resources allocated for the terminal.

Wherein, since the dynamic capability information is dynamically changed, the master serving base station may send multiple pieces of different dynamic capability information to the slave serving base station, in order to ensure that the master serving base station and the slave serving base station perform the capability negotiation at the same scheduling time based on the same dynamic capability information to avoid the problem of subsequent resource scheduling failure due to the inconsistency of the dynamic capability information on which the capability negotiation based, in another embodiment of the present disclosure, the dynamic capability information further includes a negotiation entry-into-force time, when the slave serving base station starts timing when receiving the dynamic capability information subsequently, the slave serving base station determines the terminal resources to be scheduled on request according to the previously received dynamic capability information prior to the arrival of the negotiation entry-into-force time, and performs the capability negotiation with the master serving base station according to the resources to be scheduled on request, the slave serving base station determines the resources to be scheduled on request according to the currently received dynamic capability information at the arrival of the negotiation entry-into-force time, and performs capability negotiation with the master serving base station according to the resources to be scheduled on request, and at this time, the previously received dynamic capability information becomes ineffective.

It should be noted that, the scheduling effective time period described in the foregoing step S302 is a time period between the moment when the slave serving base station receives the dynamic capability information and the moment when the dynamic capability information becomes ineffective, and the master serving base station can obtain the scheduling effective time period according to the preset negotiation entry-into-force time and the transmission delay between the master serving base station and the slave serving base station.

The capability negotiation between the master serving base station and the slave serving base station through the terminal capability information is described below through steps S305 and S306.

S305. the slave serving base station receives terminal capability information sent by the master serving base station, and determine terminal resources to be scheduled on request according to the terminal capability information.

Wherein, the terminal resources requested by the slave serving base station include: one or more of a terminal buffer size, a working frequency band and the number of radio frequency channels, which are requested for use;

S306. the slave serving base station sends a capability negotiation request message to the master serving base station, the capability negotiation request message includes the terminal resources requested by the slave serving base station for scheduling.

In the present step, the slave serving base station may send the capability negotiation request message to the master serving base station when a second preset sending condition is met; and the second preset sending condition includes a condition of triggering the slave serving base station to send the capability negotiation request message to the master serving base station.

For example, the second preset sending condition may include any one of the following five conditions:

Condition 1: the channel quality of the slave serving base station on at least one working frequency band is greater than or equal to a first preset threshold, and the load in the at least one working frequency band is less than or equal to a second preset threshold.

When the condition 1 is satisfied, it indicates that the load in the working frequency band is lower and the channel quality is better, the slave serving base station plans to schedule the terminal on the working frequency band, therefore negotiates with the master serving base station through the capability negotiation request message so as to avoid occupying the same working frequency band to generate frequency band collision, at this time, the master serving base station may increase the resources allocated to the slave serving base station.

Condition 2: the channel quality of the slave serving base station on at least one working frequency band is less than or equal to a third preset threshold.

When the condition 2 is satisfied, it indicates that the slave serving base station cannot work normally on the working frequency band, thus the slave serving base station negotiates with the master serving base station through the capability negotiation request message, so that the master serving base station learns that the slave serving base station cannot work normally on these frequency bands, the terminal resources (such as radio frequency channels, antennas and the like) corresponding to these frequency bands may be released for use by the master serving base station, and at this time, the master serving base station may decrease the resources allocated to the slave serving base station.

Condition 3: the load of the slave serving base station on at least one working frequency band is greater than or equal to a fourth preset threshold.

When the condition 3 is satisfied, it indicates that the load of one or more working frequency bands is too high, so that the slave serving base station negotiates with the master serving base station through the capability negotiation request message to notify the master serving base station that these working frequency bands may be used by the master serving base station, and at this time, the master serving base station may decrease the resources allocated to the slave serving base station.

Condition 4: the channel quality of the slave serving base station on the current working frequency band is greater than or equal to a fifth preset threshold.

When the condition 4 is satisfied, it indicates that the current channel condition of the slave serving base station is better, so that the slave serving base station negotiates with the master serving base station through the capability negotiation request message to notify the master serving base station that the slave serving base station may adopt a higher order modulation and coding mode and/or transmission mode, that is, occupy larger buffer.

The modulation mode may include QPSK (Quadrature Phase Shift Keying), 16QAM (Quadrature Amplitude Modulation), 64QAM, 256QAM, the modulation order is sequentially increased, the coding mode generally includes 1/2 coding, 2/3 coding, 3/4 coding and the like, and the order is sequentially increased; and a higher demodulation signal-to-noise ratio is required for the higher order modulation mode and coding mode, and the higher buffer is occupied, but the transmitted information is more.

Condition 5: the channel quality of the slave serving base station on the current working frequency band is less than or equal to a sixth preset threshold.

When the condition 5 is satisfied, it indicates that the current channel condition of the serving base station is worse, so that the slave serving base station negotiates with the master serving base station through the capability negotiation request message to notify the master serving base station that the slave serving base station may adopt a lower order modulation and coding mode and/or transmission mode, that is, occupy less buffer.

It should be noted that the foregoing first preset threshold to the sixth preset threshold may be configured by a network operator, for example, with respect to the load, each operator has a defined value of high load or low load for each technical standard, the channel quality threshold is related to the network planning of the operator, and generally, after the network deployment is completed, the relevant threshold is also determined.

S307. the master serving base station determines resources capable of being scheduled by the slave serving base station according to the terminal resources to be scheduled on request, and sends a capability negotiation response message to the slave serving base station.

Wherein, the capability negotiation response message is used for indicating the resources capable of being scheduled by the slave serving base station.

In the present step, the capability negotiation response message may include an indication response message, the indication response message is used for indicating to agree or refuse the terminal resources requested by the slave serving base station for scheduling. For example, when the terminal resources requested by the slave serving base station are not contradictory with the terminal resources used by the master serving base station, the terminal resources requested by the slave serving base station through the capability negotiation request message may be agreed, at this time, the master serving base station determines remaining resources capable of being used by the master serving base station on the basis of the capability resources requested by the slave serving base station for use, and performs resource scheduling according to the remaining resources, the slave serving base station performs resource scheduling according to the requested terminal resources, when the terminal resources requested by the slave serving base station are contradictory with the terminal resources used by the master serving base station, the terminal resources requested by the slave serving base station through the capability negotiation request message may be refused, at this time, the master serving base station and the slave serving base station continue to perform resource scheduling by using the dynamic capability information based on the resource use condition of the master serving base station sent by the master serving base station.

Or, the capability negotiation response message may include that, the master serving base station determines terminal resources planned to perform scheduling on the terminal according to information, for example, the working frequency band, or certain one or more channel quality, load and the like requested the slave serving base station for negotiation in the capability negotiation request message, and sends the determined terminal resources to the slave serving base station, and the slave serving base station determines available resources according to the capability negotiation response message.

After receiving the capability negotiation response message, the slave serving base station determines that the negotiation is completed, at this time, the master serving base station and the slave serving base station may perform resource scheduling on the terminal according to the negotiation result.

It should be noted that, in order to ensure that the master serving base station and the slave serving base station perform the resource scheduling based on consistent dynamic capability information, when the capability negotiation response message includes the indication response message that agrees the terminal resources requested by the slave serving base station for scheduling, in a possible implementation manner, the capability negotiation response message includes a scheduling entry-into-force time, the slave serving base station starts timing after receiving the capability negotiation response message, the slave serving base station performs the resource scheduling according to the previously requested terminal resources prior to the arrival of the scheduling entry-into-force time, and performs the resource scheduling according to the currently requested terminal resources at the arrival of the scheduling entry-into-force time; and at this time, the previously requested terminal resources become ineffective.

By adoption of the above method, the problem of data transmission failure because the scheduled resources exceed the maximum buffer of the terminal; or the terminal generates collision on the use of the radio frequency channel or the antenna, is avoided, so that the resources of the terminal are better utilized.

Figure 4:
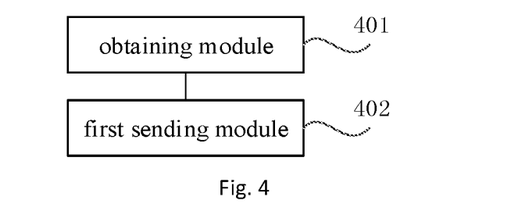
FIG. 4 is a structural schematic diagram of a resource scheduling apparatus provided by an embodiment of the present invention.

FIG. 4 shows a resource scheduling apparatus provided by an embodiment of the present invention, as shown in FIG. 4, applied to a dual connectivity scenario, in the dual connectivity scenario, a terminal respectively establishes a communication connection with a master serving base station and a slave serving base station, the apparatus is applied to the master serving base station, and the apparatus includes:

an obtaining module 401, configured to obtain terminal capability information, wherein the terminal capability information includes basic capability information and dynamic capability information; and a first sending module 402, configured to send the terminal capability information to the slave serving base station, so that the slave serving base station determines terminal resources to be scheduled on request according to the terminal capability information.

Optionally, the basic capability information includes terminal resources corresponding to the maximum capability supported by the terminal; and the dynamic capability information includes terminal resources used by the master serving base station at a scheduling time, or, terminal resources capable of being used by the slave serving base station at the scheduling time.

Figure 5:
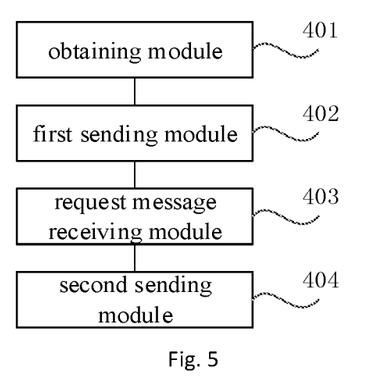
FIG. 5 is a structural schematic diagram of another resource scheduling apparatus provided by an embodiment of the present invention.

Optionally, as shown in FIG. 5, the apparatus further includes:

a request message receiving module 403, configured to receive a capability negotiation request message sent by the slave serving base station, the capability negotiation request message includes the terminal resources requested by the slave serving base station according to the terminal capability information; and a second sending module 404, configured to determine resources capable of being scheduled by the slave serving base station according to the capability negotiation request message, and send a capability negotiation response message to the slave serving base station, wherein the capability negotiation response message is used for indicating the resources capable of being scheduled by the slave serving base station.

Optionally, the obtaining module 401 is configured to obtain the basic capability information from a core network device, or receive the basic capability information reported by the terminal.

Optionally, the first sending module 402 is configured to send the dynamic capability information to the slave serving base station when a first preset sending condition is met; and the first preset sending condition includes a condition of triggering the master serving base station to send the dynamic capability information to the slave serving base station.

Optionally, the first preset sending condition includes: receiving a downlink service request corresponding to the terminal; or receiving an uplink scheduling request sent by the terminal; or determining terminal resources allocated for the terminal.

Optionally, the capability negotiation response message includes:

an indication response message, the indication response message is used for indicating to agree or refuse the terminal resources requested by the slave serving base station for scheduling; or, terminal resources capable of being scheduled by the slave serving base station determined according to the capability negotiation request message.

Optionally, when the capability negotiation response message includes the indication response message that agrees the terminal resources requested by the slave serving base station for scheduling, the capability negotiation response message includes a scheduling entry-into-force time, the second sending module 404 is configured to send the capability negotiation response message including the scheduling entry-into-force time to the slave serving base station, so that the slave serving base station performs resource scheduling according to the currently requested terminal resources at the arrival of the scheduling entry-into-force time, and performs the resource scheduling according to the previously requested terminal resources prior to the arrival of the scheduling entry-into-force time.

Optionally, the dynamic capability information includes a negotiation entry-into-force time, and the first sending module 402 is configured to send the dynamic capability information including the negotiation entry-into-force time to the slave serving base station, so that the slave serving base station determines the terminal resources to be scheduled on request according to the currently received dynamic capability information at the arrival of the negotiation entry-into-force time, and determines the terminal resources to be scheduled on request according to the previously received dynamic capability information prior to the arrival of the negotiation entry-into-force time.

It should be understood that those skilled in the art to which the present invention belongs can clearly understand that for the convenience and brevity of the description, the specific working process and description of the apparatus described above may refer to the corresponding processes in the foregoing method embodiment, and are not repeated redundantly herein.

By adoption of the above apparatus, the obtained basic capability information and the dynamic capability information of the terminal are sent to the slave serving base station, and the slave serving base station determines the resources to be scheduled on request according to the basic capability information and the dynamic capability information, thereby avoiding the problem of data transmission failure because the scheduled resources exceed the maximum buffer of the terminal, or the terminal generates collision on the use of the radio frequency channel or the antenna, so that the resources of the terminal are better utilized.

Figure 6:
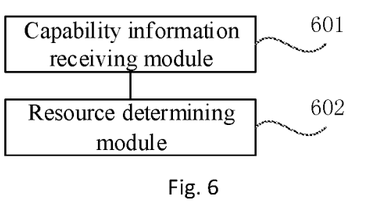
FIG. 6 is a structural schematic diagram of a third resource scheduling apparatus provided by an embodiment of the present invention.

FIG. 6 shows a resource scheduling apparatus provided by an embodiment of the present invention, as shown in FIG. 6, applied to a dual connectivity scenario, in the dual connectivity scenario, a terminal respectively establishes a communication connection with a master serving base station and a slave serving base station, the apparatus is applied to the slave serving base station, and the apparatus includes:

a capability information receiving module 601, configured to receive terminal capability information sent by the master serving base station, the terminal capability information includes basic capability information and dynamic capability information of the terminal.

Optionally, the basic capability information includes terminal resources corresponding to the maximum capability supported by the terminal; and the dynamic capability information includes terminal resources used by the master serving base station at a scheduling time, or, terminal resources capable of being used by the slave serving base station at the scheduling time.

A resource determining module 602, configured to determine terminal resources to be scheduled on request according to the received terminal capability information.

Figure 7:
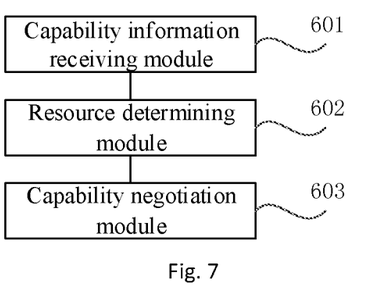
FIG. 7 is a structural schematic diagram of a fourth resource scheduling apparatus provided by an embodiment of the present invention.

Optionally, as shown in FIG. 7, the apparatus further includes:

a capability negotiation module 603, configured to perform capability negotiation with the master serving base station according to the determined terminal resources.

Figure 8:
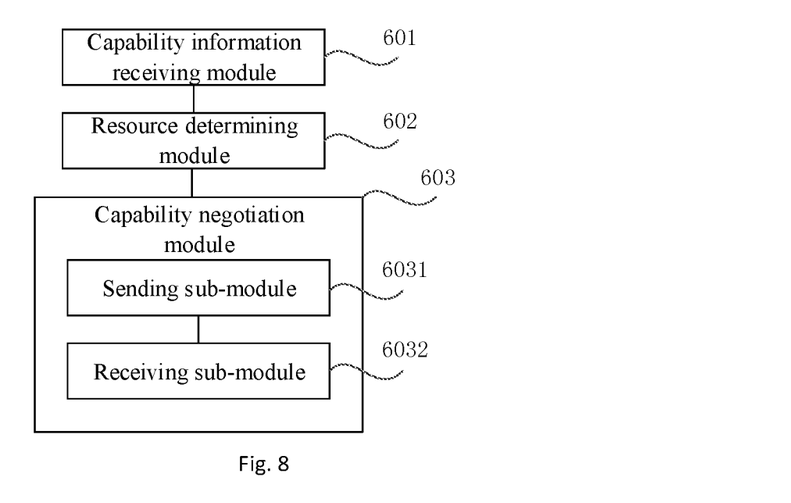
FIG. 8 is a structural schematic diagram of a fifth resource scheduling apparatus provided by an embodiment of the present invention.

Optionally, as shown in FIG. 8, the capability negotiation module 603 includes:

a sending sub-module 6031, configured to determine the requested terminal resources according to the terminal capability information, and send a capability negotiation request message to the master serving base station, the capability negotiation request message includes the terminal resources requested by the slave serving base station for scheduling; and a receiving sub-module 6032, configured to receive a capability negotiation response message sent by the master serving base station according to the terminal resources to be scheduled on request, wherein the capability negotiation response message is used for indicating the resources capable of being scheduled by the slave serving base station.

Optionally, the sending sub-module 6031 is configured to send the capability negotiation request message to the master serving base station when a second preset sending condition is met; and the second preset sending condition includes a condition of triggering the slave serving base station to send the capability negotiation request message to the master serving base station.

Optionally, the second preset sending condition includes:

the channel quality of the slave serving base station on at least one working frequency band is greater than or equal to a first preset threshold, and the load on the at least one working frequency band is less than or equal to a second preset threshold; or the channel quality of the slave serving base station on at least one working frequency band is less than or equal to a third preset threshold; or the load of the slave serving base station on at least one working frequency band is greater than or equal to a fourth preset threshold; or the channel quality of the slave serving base station on the current working frequency band is greater than or equal to a fifth preset threshold; or the channel quality of the slave serving base station on the current working frequency band is less than or equal to a sixth preset threshold.

Optionally, the dynamic capability information includes a negotiation entry-into-force time, and the capability negotiation module 603 is configured to determine the terminal resources to be scheduled on request according to the currently received dynamic capability information at the arrival of the negotiation entry-into-force time, and determine the terminal resources to be scheduled on request according to the previously received dynamic capability information prior to the arrival of the negotiation entry-into-force time.

Optionally, the capability negotiation response message includes:

an indication response message, the indication response message is used for indicating to agree or refuse the terminal resources requested by the slave serving base station for scheduling; or terminal resources capable of being scheduled by the slave serving base station determined according to the capability negotiation request message.

Optionally, the second preset sending condition includes:

the channel quality of the slave serving base station on at least one working frequency band is greater than or equal to a first preset threshold, and the load on the at least one working frequency band is less than or equal to a second preset threshold; or the channel quality of the slave serving base station on at least one working frequency band is less than or equal to a third preset threshold; or the load of the slave serving base station on at least one working frequency band is greater than or equal to a fourth preset threshold; or the channel quality of the slave serving base station on the current working frequency band is greater than or equal to a fifth preset threshold; or the channel quality of the slave serving base station on the current working frequency band is less than or equal to a sixth preset threshold.

Optionally, the dynamic capability information includes a negotiation entry-into-force time, and the negotiation module is configured to determine the terminal resources to be scheduled on request according to the currently received dynamic capability information at the arrival of the negotiation entry-into-force time; and determine the terminal resources to be scheduled on request according to the previously received dynamic capability information prior to the arrival of the negotiation entry-into-force time.

Optionally, the capability negotiation response message includes:

an indication response message, the indication response message is used for indicating to agree or refuse the terminal resources requested by the slave serving base station for scheduling; or, terminal resources capable of being scheduled by the slave serving base station determined according to the capability negotiation request message.

Figure 9:
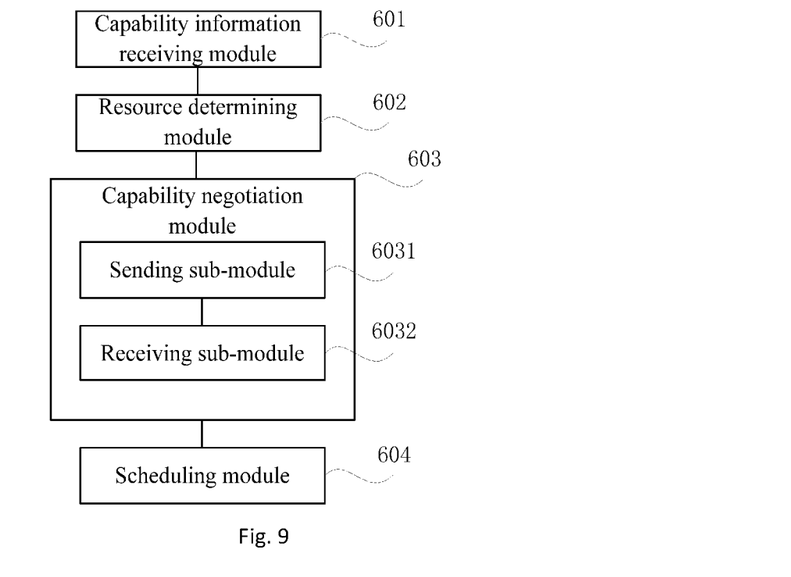
FIG. 9 is a structural schematic diagram of a sixth resource scheduling apparatus provided by an embodiment of the present invention.

Optionally, as shown in FIG. 9, when the capability negotiation response message includes the indication response message that agrees the terminal resources requested by the slave serving base station for scheduling, the capability negotiation response message includes a scheduling entry-into-force time, and the apparatus further includes:

a scheduling module 604, configured to perform resource scheduling according to the currently terminal resources to be scheduled on request at the arrival of the scheduling entry-into-force time, and perform resource scheduling according to the previously terminal resources to be scheduled on request prior to the arrival of the scheduling entry-into-force time.

It should be understood that those skilled in the art to which the present invention belongs can clearly understand that for the convenience and brevity of the description, the specific working process and description of the apparatus described above may refer to the corresponding processes in the foregoing method embodiment, and are not repeated redundantly herein.

By adoption of the above apparatus, the basic capability information and the dynamic capability information of the terminal sent by the master serving base station are received, and the terminal resources to be scheduled on request are determined according to the basic capability information and the dynamic capability information of the terminal, thereby avoiding the problem of data transmission failure because the scheduled resources exceed the maximum buffer of the terminal, or the terminal generates collision on the use of the radio frequency channel or the antenna, so that the resources of the terminal are better utilized.

Figure 10:
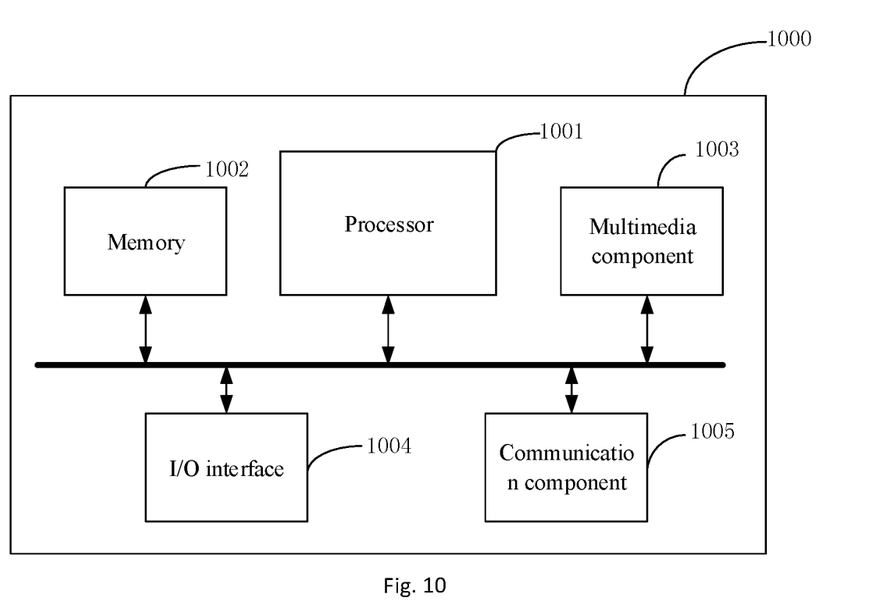
FIG. 10 is a schematic diagram of a hardware structure of a resource scheduling apparatus provided by an embodiment of the present invention.

FIG. 10 is a block diagram of a resource scheduling apparatus provided by an embodiment of the present disclosure. As shown in FIG. 10, the apparatus may be applied to a master serving base station or a slave serving base station, and the apparatus 1000 may include: a processor 1001, a memory 1002, a multimedia component 1003, an input/output (I/O) interface 1004, and a communication component 1005.

The processor 1001 is configured to control the overall operation of the apparatus 1000 to complete all or part of the steps of the foregoing capability negotiation method. The memory 1002 is configured to store various types of data to support operations in the apparatus 1000, for example, these data may include instructions for any application program or method operating on the apparatus 1000, as well as related data of the application program, such as contact data, sent and received messages, pictures, audio, videos, etc.

The memory 1002 may be implemented by any type of volatile or non-volatile storage terminal device or a combination thereof, such as a static random access memory (Static Random Access Memory, referred to as SRAM), an electrically erasable programmable read-only memory (Electrically Erasable Programmable Read-Only Memory, referred to as EEPROM), erasable programmable read-only memory (Erasable Programmable Read-Only Memory, referred to as EPROM), programmable read-only memory (Programmable Read-Only Memory, referred to as PROM), read-only memory (Read-Only Memory, referred to as ROM), a magnetic memory, a flash memory, a disk or an optical disk. The multimedia component 1003 may include a screen and an audio component. Wherein the screen may be, for example, a touch screen, and the audio component is configured to output and/or input an audio signal. For example, the audio component may include a microphone for receiving an external audio signal. The received audio signal may be further stored in the memory 1002 or transmitted via a communication component 1005. The audio component further includes at least one loudspeaker for outputting an audio signal. The I/O interface 1004 provides an interface between the processor 1001 and other interface modules, the other interface modules may be a keyboard, a mouse, a button, and the like. These buttons may be virtual buttons or physical buttons. The communication component 1005 is used for wired or wireless communication between the apparatus 1000 and other terminal devices. Wireless communication, such as Wi-Fi, Bluetooth, near field communication (Near Field Communication, referred to as NFC), 2G, 3G or 4G, or a combination of one or more of them, so the corresponding communication component 1005 may include: a Wi-Fi module, a Bluetooth module and an NFC module.

In an exemplary embodiment, the apparatus 1000 may be implemented by one or more application specific integrated circuits (Application Specific Integrated Circuit, referred to as ASIC), digital signal processors (Digital Signal Processor, referred to as DSP), digital signal processing devices (Digital Signal Processing Device, referred to as DSPD), programmable logic devices (Programmable Logic Device, referred to as PLD), field programmable gate arrays (Field Programmable Gate Array, referred to as FPGA), controllers, microcontrollers, microprocessors or other electronic components, in order to execute the above capability negotiation method.

The embodiment of the present disclosure further provides a non-transitory computer readable storage medium 1, the non-transitory computer readable storage medium 1 includes one or more programs, the one or more programs are used for executing a resource scheduling method, and the method includes: obtaining terminal capability information, wherein the terminal capability information includes basic capability information and dynamic capability information; and sending the terminal capability information to a slave serving base station, so that the slave serving base station determines terminal resources to be scheduled on request according to the terminal capability information.

Optionally, the basic capability information includes terminal resources corresponding to the maximum capability supported by the terminal; and the dynamic capability information includes terminal resources used by the master serving base station at a scheduling time, or, terminal resources capable of being used by the slave serving base station at the scheduling time.

Optionally, after the sending the terminal capability information to a slave serving base station, so that the slave serving base station determines terminal resources to be scheduled on request according to the terminal capability information, the method further includes: receiving a capability negotiation request message sent by the slave serving base station, the capability negotiation request message includes the terminal resources requested by the slave serving base station for scheduling according to the terminal capability information; and determining resources capable of being scheduled by the slave serving base station according to the capability negotiation request message, and sending a capability negotiation response message to the slave serving base station, wherein the capability negotiation response message is used for indicating the resources capable of being scheduled by the slave serving base station.

Optionally, the obtaining the basic capability information of the terminal includes: obtaining the basic capability information from a core network device; or receiving the basic capability information reported by the terminal.

Optionally, the sending the dynamic capability information in the terminal capability information to the slave serving base station includes: sending the dynamic capability information to the slave serving base station when a first preset sending condition is met; and the first preset sending condition includes a condition of triggering the master serving base station to send the dynamic capability information to the slave serving base station.

Optionally, the first preset sending condition includes: receiving a downlink service request corresponding to the terminal; or receiving an uplink scheduling request sent by the terminal; or determining terminal resources allocated for the terminal.

Optionally, the capability negotiation response message includes: an indication response message, the indication response message is used for indicating to agree or refuse the terminal resources requested by the slave serving base station for scheduling; or, terminal resources capable of being scheduled by the slave serving base station determined according to the capability negotiation request message.

Optionally, when the capability negotiation response message includes the indication response message that agrees the terminal resources requested by the slave serving base station for scheduling, the capability negotiation response message includes a scheduling entry-into-force time, the sending the capability negotiation response message to the slave serving base station includes: sending the capability negotiation response message including the scheduling entry-into-force time to the slave serving base station, so that the slave serving base station performs resource scheduling according to the currently requested terminal resources at the arrival of the scheduling entry-into-force time; and performs the resource scheduling according to the previously requested terminal resources prior to the arrival of the scheduling entry-into-force time.

Optionally, the dynamic capability information includes a negotiation entry-into-force time, and the sending the dynamic capability information in the terminal capability information to the slave serving base station includes: sending the dynamic capability information including the negotiation entry-into-force time to the slave serving base station, so that the slave serving base station determines the terminal resources to be scheduled on request according to the currently received dynamic capability information at the arrival of the negotiation entry-into-force time, and determines the terminal resources to be scheduled on request according to the previously received dynamic capability information prior to the arrival of the negotiation entry-into-force time.

The embodiment of the present disclosure further provides a base station 2, the base station 2 includes:

the non-transitory computer readable storage medium 1 described above; and one or more processors for executing the programs in the non-transitory computer readable storage medium 1 described above.

The embodiment of the present disclosure further provides a non-transitory computer readable storage medium 3, the non-transitory computer readable storage medium 3 includes one or more programs, the one or more programs are used for executing a capability negotiation method, and the method includes: receiving terminal capability information sent by a master serving base station, the terminal capability information includes basic capability information and dynamic capability information of the terminal; and determining terminal resources to be scheduled on request according to the received terminal capability information.

Optionally, the basic capability information includes terminal resources corresponding to the maximum capability supported by the terminal; and the dynamic capability information includes terminal resources used by the master serving base station at a scheduling time, or, terminal resources capable of being used by the slave serving base station at the scheduling time.

Optionally, after the determining terminal resources to be scheduled on request according to the received terminal capability information, the method further includes: performing capability negotiation with the master serving base station according to the determined terminal resources.

Optionally, the performing capability negotiation with the master serving base station according to the determined terminal resources includes: sending a capability negotiation request message to the master serving base station, the capability negotiation request message includes the terminal resources requested by the slave serving base station for scheduling; and receiving a capability negotiation response message sent by the master serving base station according to the terminal resources to be scheduled on request, wherein the capability negotiation response message is used for indicating the resources capable of being scheduled by the slave serving base station.

Optionally, the sending a capability negotiation request message to the master serving base station includes: sending the capability negotiation request message to the master serving base station when a second preset sending condition is met; and the second preset sending condition includes a condition of triggering the slave serving base station to send the capability negotiation request message to the master serving base station.

Optionally, the second preset sending condition includes: the channel quality of the slave serving base station on at least one working frequency band is greater than or equal to a first preset threshold, and the load on the at least one working frequency band is less than or equal to a second preset threshold; or, the channel quality of the slave serving base station on at least one working frequency band is less than or equal to a third preset threshold; or, the load of the slave serving base station on at least one working frequency band is greater than or equal to a fourth preset threshold; or, the channel quality of the slave serving base station on the current working frequency band is greater than or equal to a fifth preset threshold; or, the channel quality of the slave serving base station on the current working frequency band is less than or equal to a sixth preset threshold.

Optionally, the dynamic capability information includes a negotiation entry-into-force time, and the determining terminal resources to be scheduled on request according to the received terminal capability information includes: determining the terminal resources to be scheduled on request according to the currently received dynamic capability information at the arrival of the negotiation entry-into-force time; and determining the terminal resources to be scheduled on request according to the previously received dynamic capability information prior to the arrival of the negotiation entry-into-force time.

Optionally, the capability negotiation response message includes: an indication response message, the indication response message is used for indicating to agree or refuse the terminal resources requested by the slave serving base station for scheduling; or, terminal resources capable of being scheduled by the slave serving base station determined according to the capability negotiation request message.

Optionally, when the capability negotiation response message includes the indication response message that agrees the terminal resources requested by the slave serving base station for scheduling, the capability negotiation response message includes a scheduling entry-into-force time, and after the receiving a capability negotiation response message sent by the master serving base station according to the terminal resources to be scheduled on request, the method further includes: performing resource scheduling according to the currently terminal resources to be scheduled on request at the arrival of the scheduling entry-into-force time; and performing resource scheduling according to the previously terminal resources to be scheduled on request prior to the arrival of the scheduling entry-into-force time.

The embodiment of the present disclosure further provides a base station 4, wherein the base station 4 includes:
the non-transitory computer readable storage medium 3 described above; and
one or more processors for executing the programs in the non-transitory computer readable storage medium 3 described above.

The preferred embodiments of the present disclosure have been described in detail above in combination with the drawings. However, the present disclosure is not limited to the specific details in the above embodiments, various simple modifications may be made to the technical solutions of the present disclosure within the scope of the technical idea of the present disclosure, and these simple modifications are all within the protection scope of the present disclosure.

It should be further noted that the specific technical features described in the above specific embodiments may be combined in any suitable manner without contradiction. In order to avoid unnecessary repetition, various possible combination manners are not described separately in the present disclosure.

In addition, various different embodiments of the present disclosure may also be randomly combined, and the combinations should also be considered as the contents disclosed by the present disclosure as long as not deviating from the idea of the present disclosure.

The invention claimed is:

1. A resource scheduling method, applied to a dual connectivity scenario, in the dual connectivity scenario, a terminal respectively establishes a communication connection with a master serving base station and a slave serving base station, the method is applied to the master serving base station, and the method comprises:
   obtaining terminal capability information, wherein the terminal capability information comprises basic capability information and dynamic capability information;
   sending the terminal capability information to the slave serving base station, so that the slave serving base station determines terminal resources to be scheduled on request according to the terminal capability information;
   wherein the dynamic capability information comprises a negotiation entry-into-force time, and the sending the dynamic capability information in the terminal capability information to the slave serving base station comprises;
   sending the dynamic capability information including the negotiation entry-into-force time to the slave serving base station, so that the slave serving base station determines the terminal resources to be scheduled on request according to currently received dynamic capability information at the arrival of the negotiation entry-into-force time; and determines the terminal resources to be scheduled on request according to previously received dynamic capability information prior to the arrival of the negotiation entry-into-force time.

2. The method according to claim 1, wherein the basic capability information comprises terminal resources corresponding to a maximum capability supported by the terminal; and the dynamic capability information comprises terminal resources used by the master serving base station at a scheduling time, or, terminal resources capable of being used by the slave serving base station at the scheduling time.

3. The method according to claim 1, wherein after the sending the terminal capability information to the slave serving base station, so that the slave serving base station determines terminal resources to be scheduled on request according to the terminal capability information, the method further comprises:

receiving a capability negotiation request message sent by the slave serving base station, the capability negotiation request message comprises the terminal resources requested by the slave serving base station for scheduling according to the terminal capability information; and determining resources capable of being scheduled by the slave serving base station according to the capability negotiation request message, and sending a capability negotiation response message to the slave serving base station, wherein the capability negotiation response message is used for indicating the resources capable of being scheduled by the slave serving base station.

4. The method according to claim 3, wherein the capability negotiation response message comprises:

an indication response message, the indication response message is used for indicating to agree or refuse the terminal resources requested by the slave serving base station for scheduling; or, terminal resources capable of being scheduled by the slave serving base station determined according to the capability negotiation request message.

5. The method according to claim 4, wherein when the capability negotiation response message comprises the indication response message that agrees the terminal resources requested by the slave serving base station for scheduling, the capability negotiation response message comprises a scheduling entry-into-force time, the sending the capability negotiation response message to the slave serving base station comprises:

sending the capability negotiation response message including the scheduling entry-into-force time to the slave serving base station, so that the slave serving base station performs resource scheduling according to currently requested terminal resources at the arrival of the scheduling entry-into-force time; and performs the resource scheduling according to the previously requested terminal resources prior to the arrival of the scheduling entry-into-force time.

6. The method according to claim 1, wherein the obtaining the basic capability information of the terminal comprises:

obtaining the basic capability information from a core network device; or, receiving the basic capability information reported by the terminal.

7. The method according to claim 1, wherein the sending the dynamic capability information in the terminal capability information to the slave serving base station comprises:

sending the dynamic capability information to the slave serving base station when a first preset sending condition is met; and the first preset sending condition comprises a condition of triggering the master serving base station to send the dynamic capability information to the slave serving base station.

8. The method according to claim 7, wherein the first preset sending condition comprises:

receiving a downlink service request corresponding to the terminal; or, receiving an uplink scheduling request sent by the terminal; or, determining terminal resources allocated for the terminal.

9. A non-transitory computer readable storage medium, wherein the non-transitory computer readable storage medium comprises one or more programs, and the one or more programs are used for executing the method according to claim 1.

10. A base station, comprising:

the non-transitory computer readable storage medium according to claim 9; and one or more processors for executing a program in the non-transitory computer readable storage medium.

11. A resource scheduling method, applied to a dual connectivity scenario, in the dual connectivity scenario, a terminal respectively establishes a communication connection with a master serving base station and a slave serving base station, the method is applied to the slave serving base station, and the method comprises:

receiving terminal capability information sent by the master serving base station; the terminal capability information comprises basic capability information and dynamic capability information of the terminal; and determining terminal resources to be scheduled on request according to the received terminal capability information;

wherein the dynamic capability information comprises a negotiation entry-into-force time, and the determining terminal resources to be scheduled on request according to the received terminal capability information comprises:

determining the terminal resources to be scheduled on request according to currently received dynamic capability information at the arrival of the negotiation entry-into-force time;

determining the terminal resources to be scheduled on request according to previously received dynamic capability information prior to the arrival of the negotiation entry-into-force time.

12. The method according to claim 11, wherein the basic capability information comprises terminal resources corresponding to the maximum capability supported by the terminal; and the dynamic capability information comprises terminal resources used by the master serving base station at a scheduling time, or, terminal resources capable of being used by the slave serving base station at the scheduling time.

13. The method according to claim 11, wherein after the determining terminal resources to be scheduled on request according to the received terminal capability information, the method further comprises:

performing capability negotiation with the master serving base station according to the determined terminal resources.

14. The method according to claim 13, wherein the performing capability negotiation with the master serving base station according to the determined terminal resources comprises:

sending a capability negotiation request message to the master serving base station; the capability negotiation request message comprises the terminal resources requested by the slave serving base station for scheduling;

receiving a capability negotiation response message sent by the master serving base station according to the terminal resources to be scheduled on request, wherein the capability negotiation response message is used for indicating the resources capable of being scheduled by the slave serving base station.

15. The method according to claim 14, wherein the sending a capability negotiation request message to the master serving base station comprises:

sending the capability negotiation request message to the master serving base station when a second preset sending condition is met; and the second preset sending condition comprises a condition of triggering the slave serving base station to send the capability negotiation request message to the master serving base station.

16. The method according to claim 15, wherein the second preset sending condition comprises:

the channel quality of the slave serving base station on at least one working frequency band is greater than or equal to a first preset threshold, and the load on the at least one working frequency band is less than or equal to a second preset threshold; or, the channel quality of the slave serving base station on at least one working frequency band is less than or equal to a third preset threshold; or, the load of the slave serving base station on at least one working frequency band is greater than or equal to a fourth preset threshold; or, the channel quality of the slave serving base station on a current working frequency band is greater than or equal to a fifth preset threshold; or, the channel quality of the slave serving base station on the current working frequency band is less than or equal to a sixth preset threshold.

17. The method according to claim 14, wherein the capability negotiation response message comprises:

an indication response message, the indication response message is used for indicating to agree or refuse the terminal resources requested by the slave serving base station for scheduling; or, terminal resources capable of being scheduled by the slave serving base station determined according to the capability negotiation request message.

18. The method according to claim 17, wherein when the capability negotiation response message comprises the indication response message that agrees the terminal resources requested by the slave serving base station for scheduling, the capability negotiation response message comprises a scheduling entry-into-force time, and after the receiving a capability negotiation response message sent by the master serving base station according to the terminal resources to be scheduled on request, the method further comprises:

performing resource scheduling according to currently determined terminal resources to be scheduled on request at the arrival of the scheduling entry-into-force time; and performing resource scheduling according to previously determined terminal resources to be scheduled on request prior to the arrival of the scheduling entry-into-force time.

19. A non-transitory computer readable storage medium, wherein the non-transitory computer readable storage medium comprises one or more programs, and the one or more programs are used for executing the method according to claim 11.

20. A base station, comprising:

the non-transitory computer readable storage medium according to claim 19; and one or more processors for executing a program in the non-transitory computer readable storage medium.

* * * * *